US008775268B2

(12) United States Patent
Howorka et al.

(10) Patent No.: US 8,775,268 B2
(45) Date of Patent: *Jul. 8, 2014

(54) SYSTEMS FOR AUTOMATED TRADING AND CONVERSION OF UNMATCHED AMOUNTS INTO NEW QUOTES

(75) Inventors: Edward Howorka, Denville, NJ (US); Tracy Riordan, Parsippany, NJ (US)

(73) Assignee: EBS Group Limited, London (GB)

( * ) Notice: Subject to any disclaimer, the term of this patent is extended or adjusted under 35 U.S.C. 154(b) by 385 days.

This patent is subject to a terminal disclaimer.

(21) Appl. No.: 13/013,952

(22) Filed: Jan. 26, 2011

(65) Prior Publication Data
US 2011/0119174 A1    May 19, 2011

Related U.S. Application Data

(63) Continuation of application No. 11/464,848, filed on Aug. 16, 2006, now Pat. No. 7,925,545.

(60) Provisional application No. 60/708,456, filed on Aug. 16, 2005.

(51) Int. Cl.
*G06Q 30/00*    (2012.01)
(52) U.S. Cl.
USPC ..................................... 705/26.4; 705/26.41
(58) Field of Classification Search
USPC .......................................... 705/26.1–27.2, 80
See application file for complete search history.

(56) References Cited

U.S. PATENT DOCUMENTS

| 5,136,501 | A | 8/1992 | Silverman et al. |
| 5,375,055 | A | 12/1994 | Togher et al. |
| 7,415,436 | B1 | 8/2008 | Evelyn et al. |
| 7,925,545 | B2 * | 4/2011 | Howorka et al. .......... 705/26.41 |
| 2005/0228739 | A1 | 10/2005 | Leibowitz |

FOREIGN PATENT DOCUMENTS

EP         1 363 223 A1   11/2003
WO    WO-2004/068274 A2    8/2004

OTHER PUBLICATIONS

"e-Quisitions Inc. Announces Inaugural Install of its Flagship Product e-Quinox". Canada NewsWire. Ottawa: Feb. 4, 2002. p. 1.

* cited by examiner

*Primary Examiner* — William Allen
(74) *Attorney, Agent, or Firm* — Dickstein Shapiro LLP

(57) ABSTRACT

Quotes entered into an automated trading system may comprise a visible, or primary, amount, and a linked or hidden amount. The visible amount only is shown to other traders on the system but part or all of the linked amount may be dealt if the order with the quote is match is for an amount greater than the visible amount. If, after matching and deal confirmation, all the visible amount has been dealt, but some or all of the linked amount remains, a fresh order for the remaining linked amount is generated and submitted to the trading system for matching. The new quoted may be visible only or may have a visible component up to a limit specified by the maker on submission of the original quote, with the remainder being linked. Maker quotes converted to taker quotes by an auto-match routine may be resubmitted for undealt linked amounts in the same way. In one aspect of the invention, linked amounts are matched and dealt before visible amounts.

8 Claims, 6 Drawing Sheets

SYSTEMS FOR AUTOMATED TRADING AND CONVERSION OF UNMATCHED AMOUNTS INTO NEW QUOTES

CROSS REFERENCE TO RELATED APPLICATIONS

This application is a Continuation of application Ser. No. 11/464,848, filed on Aug. 16, 2006, which claims benefit under 35 U.S.C. §119(e) to U.S. Provisional Application No. 60/708,456, filed on Aug. 16, 2005, the entirety of each of which is incorporated by reference herein.

FIELD OF THE INVENTION

This invention relates to automated trading systems and in particular to the handling of quotes which include parts which are visible to other traders on the system and parts which are invisible to other traders on the system.

BACKGROUND OF THE INVENTION

Anonymous trading systems are known which allow traders to hide their true degree of interest from the market when they submit quotes to buy or sell the product traded on the system, typically a financial instrument. A quote is a visible order to buy or sell the product which is submitted into the system by a market maker and which is displayed to potential counterparties, sometimes subject to eligibility criteria such as bilateral credit between the parties. The quote will typically include the amount of the order, the price, and an indication as to whether it is a buy or a sell order. In anonymous trading systems the identity of the party submitting the quote is known to the trading system but is not shown to other parties on the system until a trade has been completed at which point the identity of the counterparties is released to each other.

It is of great importance to traders that they do not disclose their trading intentions to the market, as this could affect the market to their detriment. For example, if it was clear that a given trader needed to buy a very large amount of a particular product, the price of offers to sell that product submitted by third parties could rise, resulting in the trader having to buy at an inflated price. For this reason some trading systems have introduced the ability to submit quotes with a primary and a hidden or linked amount. A quote is submitted that has a primary amount which is displayed to the market and a linked amount which is not displayed. Thus the trader can conceal the true degree of their interest. One example of this type of order is disclosed in U.S. Pat. No. 5,136,501 of Reuters Limited. Another example is implemented on the EBS Foreign Exchange Dealing System provided by EBS Group Ltd of London, England. Both of these systems allow a quote to have a primary, visible, amount and a secondary linked amount which is invisible to traders. If a quote is matched for an amount more than the primary amount, a portion, or all, of the linked amount will also be dealt as necessary to fill the order. However, any remaining portion of the linked amount will be then be cancelled. Similarly, if the quote is dealt for the exact amount of the primary amount, the linked amount will be cancelled. If not all the primary amount is dealt, the remaining amount remains in the system together with the linked amount.

This approach to hidden or linked amounts allows maker orders to include linked amounts. Takers who submit invisible orders (hits) have no facility for submitting linked amounts. The manner in which hidden amounts work can be better understood from the following example. Consider a situation illustrated in FIG. 1 where a party A submits a quote consisting of an offer to sell for a primary amount of 5 (million) and a linked amount of 5 million. The primary amount is displayed to those counterparty trading floors with which there is sufficient bilateral credit to trade. Party A has the first quote in the market and is first in the queue. A second party B then submits an offer to sell for a primary amount of 20 at the same price a little after party A. Party B is second in the queue behind party A. A third party C then submits a bid to buy for 4 at the offer price. Because the system matches on price time priority, party C's bid will be matched with party A's offer. A deal is now pending between parties A and C with 4 million of party A's primary amount reserved in an initiated state. Finally, a fourth party, party D submits a buy bid for 25 at the offer price at a time after party C's buy. Party A has a pending deal with party C for 4 million, and only part of the primary amount initiated. Thus Party D is matched with party A for the remaining primary amount of 1 M and the linked amount of 5 M. A deal is now pending for 6 M between parties A and D. The deal between parties A and C is then completed and confirmed as a done deal. Party A's balance of 6 is not available for matching because the full primary amount (1 M) is in the initiated state. Thus, a match is made between parties B and D and a deal is pending between B and D for 19 M. The pending deal between A and D is then confirmed for 6 M (1 primary and 5 linked). Party A's original offer of 5 visible and 5 linked is now complete and is removed from the market. Next, the pending deal between B and D is completed and confirmed as done between B and D for 19. However, parties B's original offer for 20 has one remaining and that offer remains in the system as a live quote which is now at the top of the queue.

If, in the example above, the party C buy had been for 5, the entire primary amount of party A's offer would have been in a deal pending state. The remaining lined order for 5 could not have been matched with the party D buy order. When the party A and C deal was completed, the linked amount would have been cancelled. If the party A and C deal had failed, for example through lack of credit, both the primary and the linked amounts of party A's offer would have again been available for matching.

SUMMARY OF THE INVENTION

Linked or hidden amounts, as presently implemented, are a useful addition to the tools available to traders. However, we have appreciated they are at present limited in their usefulness. The invention therefore aims to provide an improved method and system for enabling quotes to be submitted with hidden or linked amounts.

Broadly, a first aspect of the invention submits unmatched hidden amounts as fresh quotes into the system. A second aspect of the invention allows traders to work the balance by submitting back into the system bids and offers with both a visible and an invisible amount. A third aspect of the invention reverses the order that quotes with hidden amounts are matched, so that the hidden amount is matched before the visible amount. In one preferred embodiment of the third aspect, a minimum visible amount may be matched before the invisible amount, followed by the remainder of the visible amount.

More specifically, the invention provides an automated trading system for trading products between traders, comprising: a plurality of order input devices for entering quotes to buy or sell products traded on the system, the quotes including a price, a visible amount and a linked hidden amount, and for entering orders in response to quotes input from others of the plurality of order input devices; a market distribution component for distributing quotes to order input devices, the quotes being shown to order input devices only for the visible amounts; a matching engine for matching quotes to buy or sell with orders submitted in response to the quotes, the matching engine being configured to match the visible amounts of the quotes matched before the linked amounts; and a quote generation and submission device for converting any residual unmatched linked amount into a fresh quote at the same price as the matched quote and submitting the fresh quote to the system for matching.

Embodiments of the invention have the advantage that parties trading on the system can trade the whole amount that they wish to trade and not have to physically resubmit the unmatched linked amount as a new quote as in prior art systems. This requires vigilance on the part of the trading party and is time consuming. As markets can move very fast, automatic resubmission by the system can be the difference between a quote being entered at a price that will be dealt and one that is outside the current market.

Preferably, the quote generation and submission device is configured to submit the fresh quote only after a deal for the matched amount of the original quote has been confirmed. Preferably quotes entered from the order input devices include an indication of a limit of the hidden or linked amount that can be shown to other order input devices as a visible amount in a fresh quote, and the quote generation and submission device is configured to form a fresh quote having a visible amount up to the visible amount limit with the remainder as a linked amount. This latter feature has the advantage that the trading party still does not need to display the extent of their interest to the market. They may specify a small amount of the total original linked amount as being convertible to a visible amount in a new order, but keep the remainder as invisible.

Preferably, the matching engine comprises an auto-matching component for matching quotes submitted by two order input devices, one of the quotes being converted by the auto-matching component into a taker order, and wherein the quote to be converted into a taker order includes a price, a visible amount, a linked amount, and an indication of a limit of the linked amount that can be shown as a visible amount, and wherein the quote generation and submission device is configured to convert any residual unmatched linked amount of the converted taker order following the auto-match into a fresh quote at the same price as the matched quote and to submit the fresh quote to the system for matching, the fresh quote having a visible amount up to the limit indicated with the remainder as a linked amount. The conversion of maker quotes to taker orders for auto-matching is known, but this preferred embodiment enable the advantage of resubmitted unmatched linked amounts with limited visible display to be extended to taker orders, so enabling taker side linked amounts.

Preferably, it is the later submitted quote that is converted into a taker order.

The invention also provides an automated trading system for trading products between traders, comprising: a plurality of order input devices for entering quotes to buy or sell products traded on the system, the quotes including a price, a visible amount and a hidden or linked amount, and for entering orders in response to quotes input from others of the plurality of order input devices; a market distribution component for distributing quotes to order input devices, the quotes being shown to order input devices only for the visible amounts; and a matching engine for matching quotes with hits submitted from order input devices, the matching engine being configured to match the linked amount of the quotes before the visible amount.

Preferably any unmatched amount of a quote remains in the system available for matching by the matching engine.

Preferably the matching engine is arranged to match an amount less than the whole of the visible amount, prior to matching the linked, the remainder of the visible amount being matched after matching of the linked amount. The amount less than the whole of the visible amount may be the minimum quote amount permitted by the system.

The invention further provides an automated trading system for trading products between traders, comprising: a plurality of order input devices for entering quotes to buy or sell products traded on the system, the quotes including a price, a visible amount and an invisible linked amount, and for entering orders in response to quotes input from others of the plurality of order input devices; a market distribution component for distributing quotes to order input devices, the quotes being shown to order input devices only for the visible amounts; a matching engine for matching quotes to buy or sell with orders submitted in response to the quotes, the matching engine being configured to match the visible amounts of the quotes matched before the linked amounts, and having an auto-matching component for matching quotes submitted by two order input devices, one of the quotes being converted by the auto-matching component into a taker order, and wherein a quote to be converted into a taker order includes a price, a visible amount, an invisible linked amount, and an indication of a limit of the linked amount that can be shown as a visible amount; and a quote generation and submission device for converting any residual unmatched linked amount of the converted taker order following auto-match into a fresh quote at the same price as the matched quote and for submitting the fresh quote to the system for matching, the fresh quote having a visible amount up to the limit indicated with the remainder as a linked amount.

Preferably, the quote generation and submission device is configured to submit the fresh quote only after a deal for the auto-matched amount of the original quote has been confirmed.

BRIEF DESCRIPTION OF DRAWINGS

Embodiments of the invention will now be described, by way of example only, and with reference to the accompanying drawings, in which.

Figure 1:
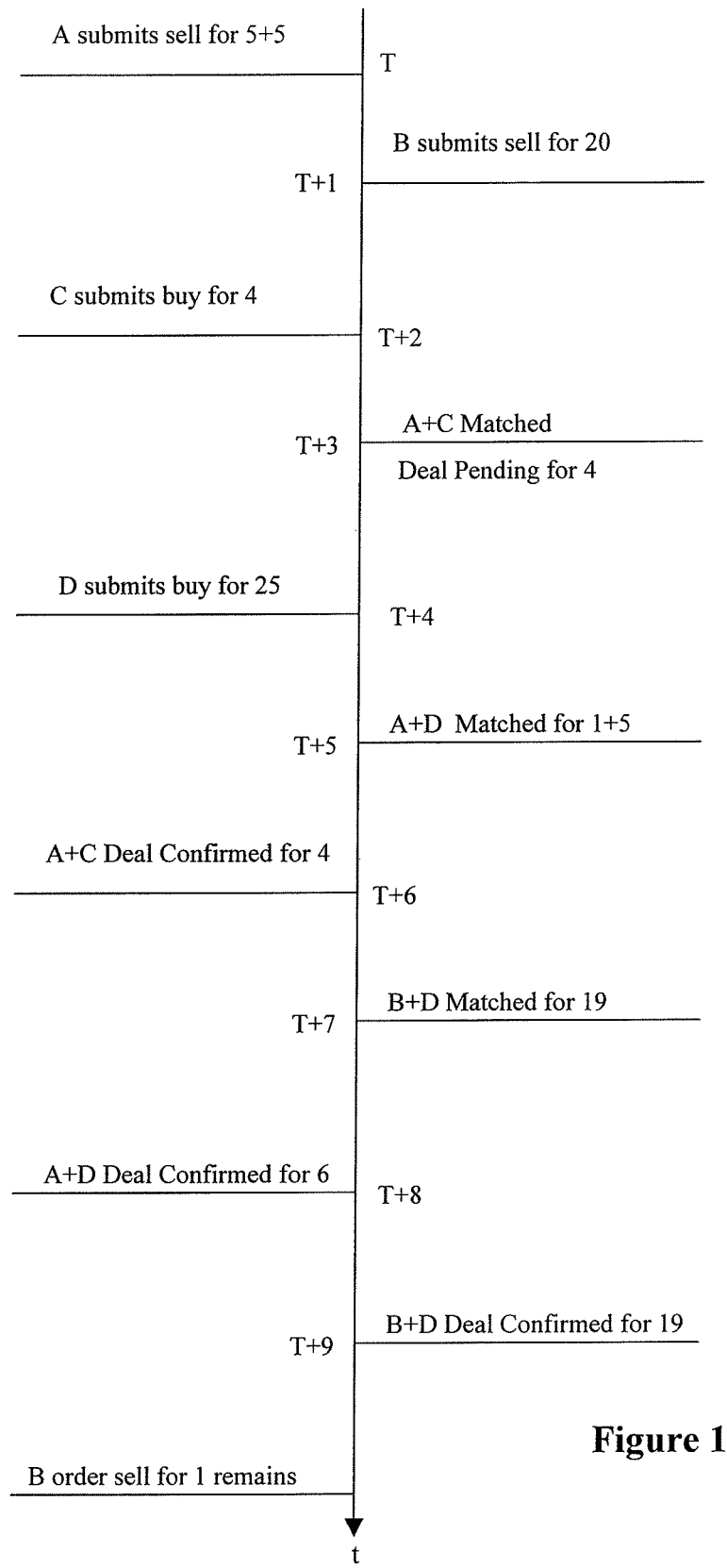
FIG. 1 is a time line showing the prior art process described above.
Figure 2:
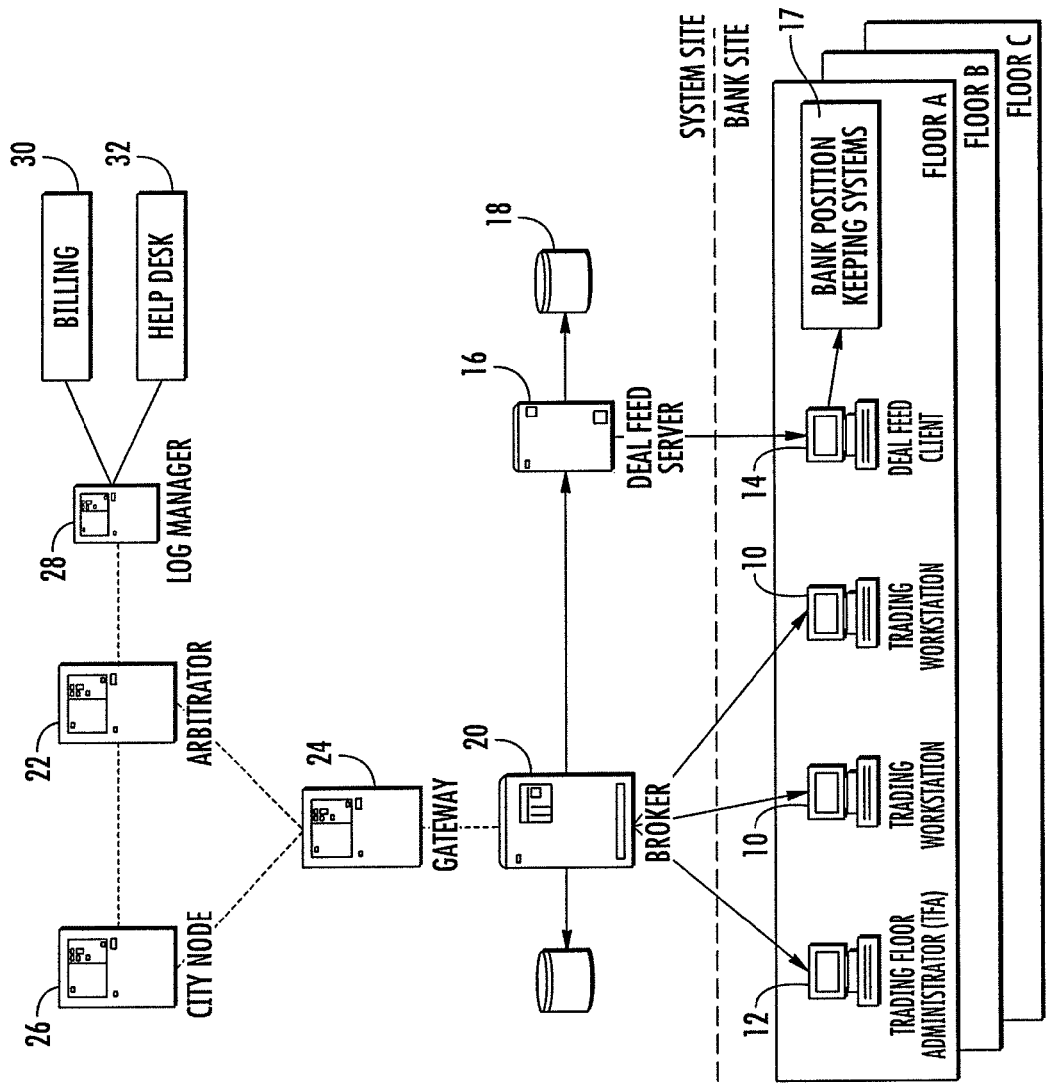
FIG. 2 is a schematic representation of an anonymous trading system on which aspects of the invention may be embodied.

The figure shows an exemplary embodiment of an anonymous trading system on which the invention may be embodied. Other system architectures are possible and the invention is not dependent on any particular system architecture. Moreover, the invention is not limited to anonymous trading systems and may be applied in systems in which the identity of parties submitting quotes is not concealed. The architecture shown in the figure is based on a distributed architecture disclosed in U.S. Pat. No. 5,375,055 (Togher), the contents of which are incorporated herein by reference. Alternatively, the invention could run on a host based system such as that disclosed in EP-A-0,399,850. In the embodiment shown, a number of trading floors A B and C are shown. Each of these includes a plurality of order input devices shown as trader terminals 10, a trading floor administrator 12, and a deal feed client terminal 14. The deal feed client is a workstation which receives done deal tickets from a deal feed server 16 and communicates those tickets to the trading floor's party position keeping systems 17 for, amongst other things, settlement. The trading floor administrator is a terminal which has administration privileges and through which system parameters for the trading floor, such as credit limits, are set. The order input devices 10 shown are trader terminals which are workstations used by traders to communicate with the system by exchange of deal related messages and which displays market related information to the traders. Order input devices may include automated trading interfaces which run trading algorithms and automatically submit orders to the market in response to data received from the system representing market conditions.

The deal feed server 16 is connected to a mass data storage device 18 which keeps a record of deals done on the system and to a broking node 20 from which it receives done deal information for generation of deal tickets. The broking node 20 acts as the interface between the trading floor and the arbitrator 22 which, amongst other things, acts as a matching engine to match quotes submitted into the system. The braking node is responsible for storing credit limits and for preparing market views for distribution to trading floors in accordance with their credit limits, quotes from parties with whom a trading floor does not have credit being withheld from the trading floor. The broker node is also responsible for quote submission, deal status information and notification, trader profile information and entitlements and the storage of settlement instructions. The broker node communicates with the arbitrator via a gateway 24. In practice, in the EBS system, there are three separate arbitrators positioned geographically apart from one another with one arbitrator covering each of the three major trading regions: North and South America, Europe and the Far East. Also, in practice, each arbitrator has a plurality of brokers connected to it, with each broker interfacing with a plurality of trading floors. The arbitrator and gateway nodes also communicate with a city node 26 which is used for provision of market rates and news information. The arbitrator is additionally connected to a log manager 28 which, in turn, is connected to billing and help desk components 30, 32.

When a trader submits a visible quote into the system, a bid or an offer, the quote will be displayed to those third party trading floors which have bilateral credit with the trading floor from which the quote originated. The quote includes the amount to be bought or sold and the rate. Typically the quote will be entered by the trader by filling in the price and amount in a panel displayed on the trader workstation display. The order includes an inherent identification of the product that is being traded although in most anonymous systems the trader will not need to enter this information. A party which places visible quotes into the market is a market maker as they are providing quotes for other parties to deal. A third party wishing to conclude a deal on the at the rate bid or offered can either submit an invisible order or another visible order. An invisible order is one which is not displayed to other parties on the system and is known as a hit or a take. A trader seeing a quote on their screen may submit a hit to conclude a deal, if they are quick enough and the deal does not fail, for example due to insufficient credit. A counterparty may also be matched with a visible order by submitting a visible order of their own. In the EBS system this is achieved by a process known as auto-match. By submitting their own visible quote, the party is a maker in their own right but auto-match, which is a well known feature of the existing EBS system will match two maker quotes together if the prices match and the quotes of on opposite sides, that is one is an offer to sell and the other is a bid to buy. Auto-matches may occur when a trader fortuitously submits a quote into the system or when the trader sees a quote on their display and deliberately submits a quote, rather than a hit/take. The auto-match process converts the second maker, on a time basis, into the taker for that deal. We have appreciated that the process of auto-match can be extended to enable taker side linked amounts. The prior art provision of linked amounts is maker side only. Thus only one party to a deal, the maker, can submit a linked amount as part of their order. The terms hidden amounts and linked amounts are used hereinafter both to mean an amount that is linked to a visible amount but is invisible to traders.

The technique to be described involves working the balance of the taker order, that is the maker order which the auto-match process converts into a taker order. If the taker order is for an amount greater than the maker order, the residual amount, rather than being cancelled, is worked by resubmitting it into the system as a fresh maker order. The order goes to the back of the queue of orders to be dealt at that price; that is it loses its time priority.

Thus, one aspect of the invention allows traders to include linked amounts in orders which are auto-matched and which become taker orders. Of course, in the prior art systems, any maker order could include a linked amount, but if it was auto-matched and became a taker order, the linked amount was automatically combined with the primary amount. On completion of the auto-match, the balance would be resubmitted as a fresh order. Thus, the benefit of the linked amount, that of not disclosing the trader's position, is lost. In this aspect of the invention the trader, when submitting a quote with a linked amount includes not only the amount of the linked part of the deal, but also how much of that amount he is prepared to show if the quote is resubmitted. Thus a trader may indicate that no more than 1 M should be shown as a visible quote. This approach allows traders to continue to conceal their true level of interest and effectively provides taker side linked amounts in the auto-match process. This approach is also applicable to conventional orders submitted with linked amounts. In prior systems, any undealt portion of the linked amount is cancelled. In one aspect of the invention, the undealt portion of the linked amount, which could be all the linked amount, is resubmitted to the system as a fresh quote, with the attendant loss of time priority. This fresh quote may either be a simple visible order or may apply the same limit to the amount of the order that may be displayed as a visible order with the remainder being a linked amount.

A third aspect of the invention reverses the order in which the visible and linked parts of the order are dealt so that the linked amount is deal first and then the visible amount. Any residual amount still remains in the market but unlike the examples given above, it is not necessary to resubmit these residual amounts as that are visible amounts which remain in the market. The difference is that the residual amounts retain their time priority which would be lost of a new quote was submitted. In a preferred embodiment of this aspect, a minimum visible amount may be dealt first, for example $1 M followed by the linked amount and then the balance of the visible amount. This approach may be needed in some systems in which market information in the form of done deals is displayed to all participants. This would not be possible if there was no visible amount dealt These aspects will now be illustrated with reference to sample scenarios, whose time lines are show in FIGS. 3 to 6 respectively.

Figure 3:
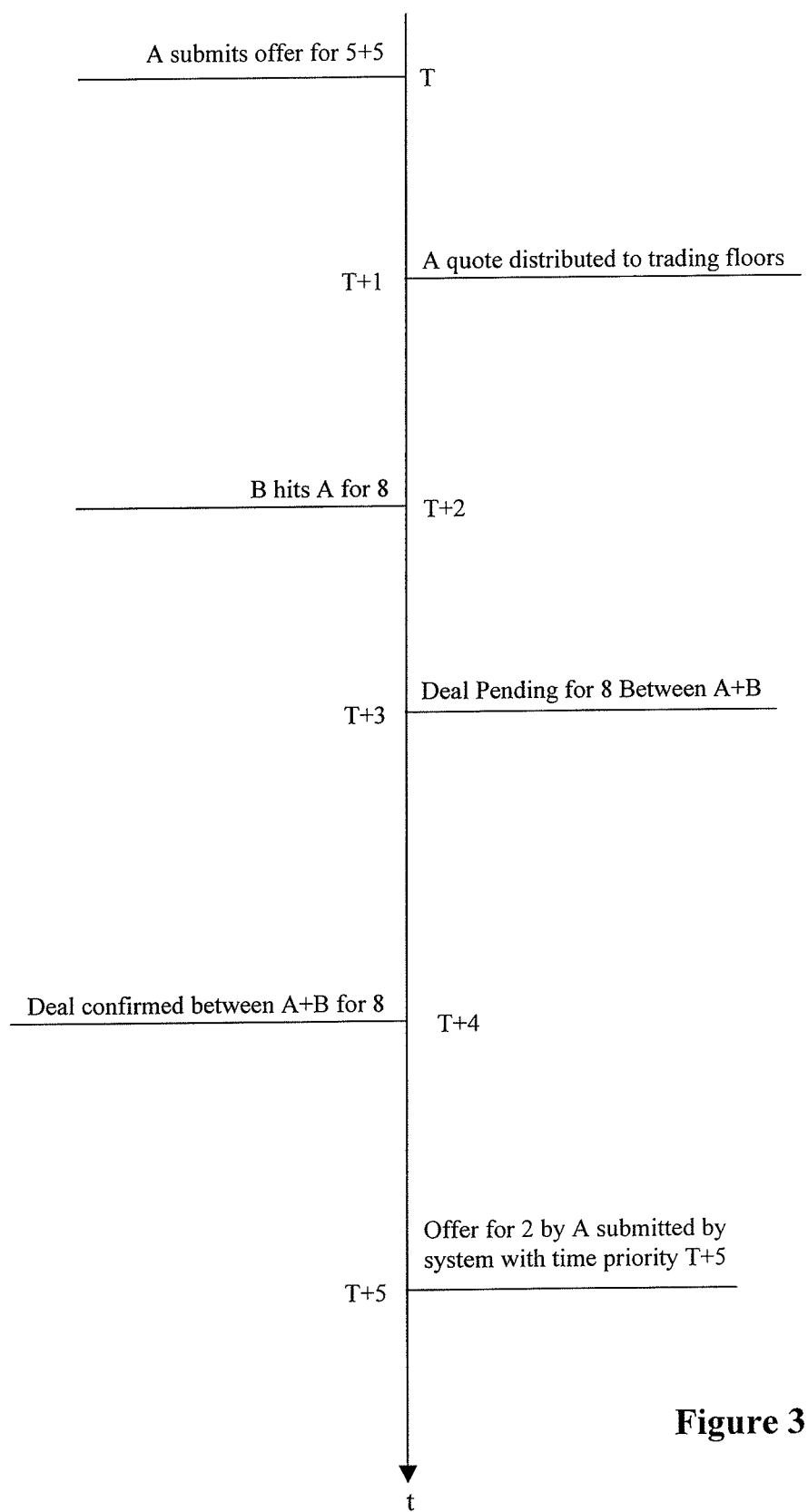
FIG. 3 is a time line diagram illustrating a first aspect of the invention.

Scenario 1—Resubmission of undealt linked amounts (FIG. 3).

At time T party A submits a quote having a primary offer amount of 5 (Million) and a linked amount of 5. The party A quote is at the front of the queue.

At time T+1, the party A quote is distributed to trading floors with whom party A has bilateral credit and is displayed at the trader workstations of counterparty traders.

At time T+2, party B hits the party A quote for 8. The hit is an invisible order, so automatch does not apply.

At time T+3, a deal is pending for 8 between parties A and B.

At time T+4, the deal is confirmed for 8 which comprises the primary amount of 5 and the linked amount of 3.

At time T+5, a new quote for 2 is submitted to the market as a visible quote and with time T+5, having a lower time priority than any other quotes at the same price entered since time T.

Figure 4:
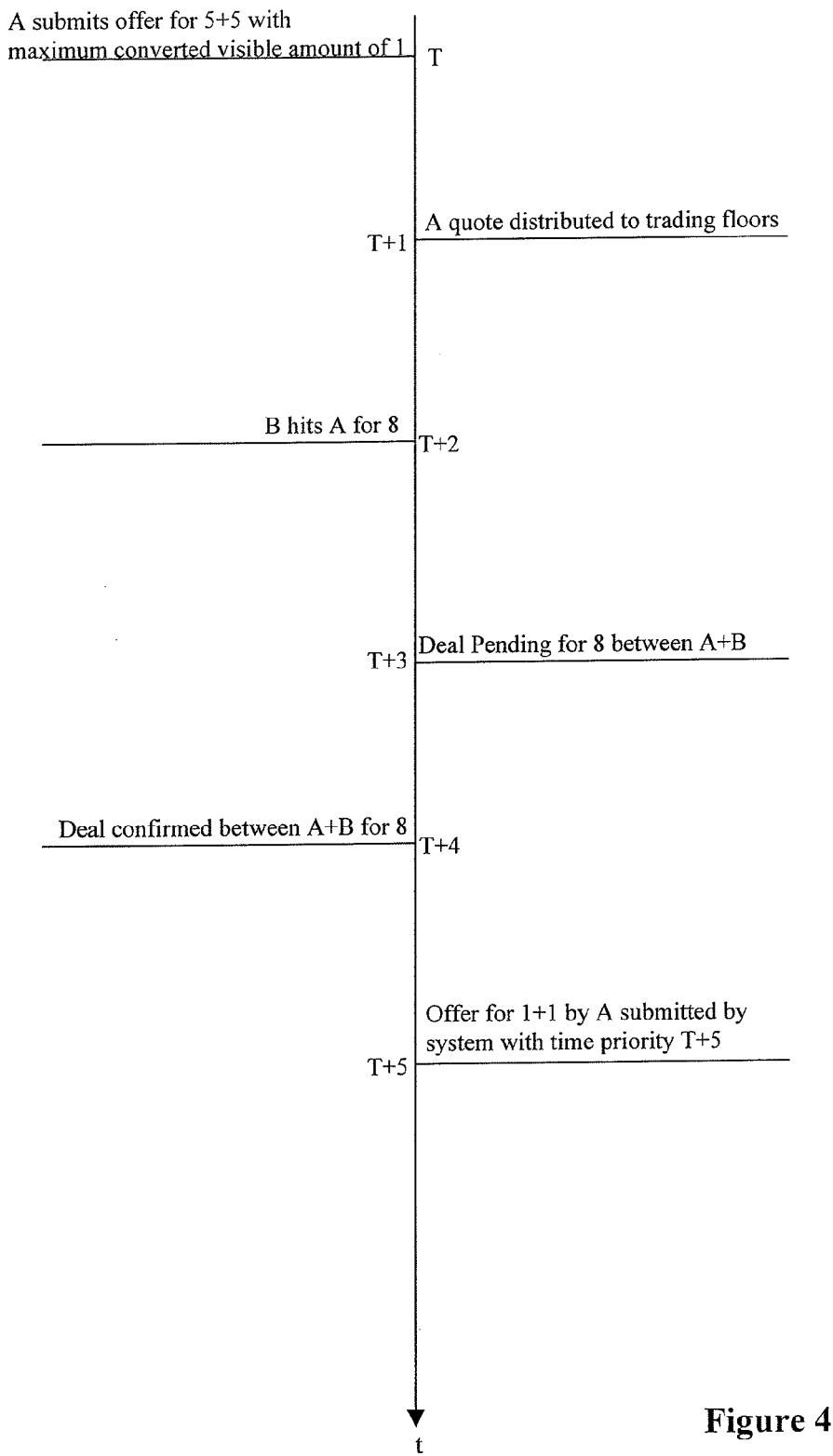
FIG. 4 is a time line diagram illustrating a second aspect of the invention.

Scenario 2—Resubmission of undealt linked amounts with maximum shown amount (FIG. 4).

The process is the same as scenario 1 except that at time T, when Party A submits their order, they additionally specify that the maximum amount of the linked amount that may be converted into a visible quote is 1. Conveniently, this will be a box in the order entry panel into which the trader enter details of the quote. This may have a default value unless set by the trader.

At time T+5, rather than submitting a new visible quote for 2, the system will generate a primary quote for 1 with a linked amount of 1.

Figure 5:
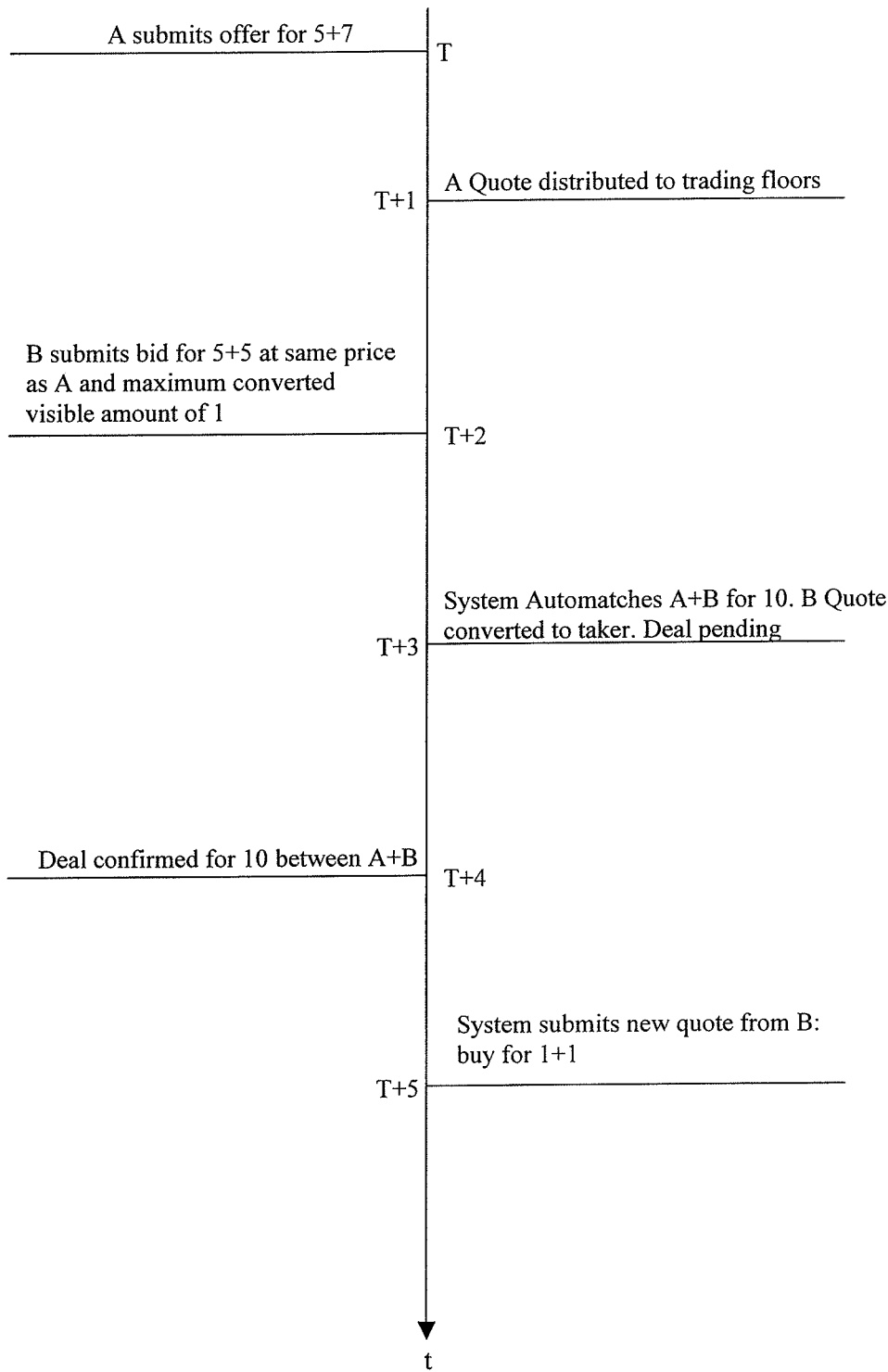
FIG. 5 is a time line diagram illustrating a third aspect of the invention.

Scenario 3—Auto-match with linked amounts (FIG. 5)

At time T party A submits a quote having a primary offer amount of 5 (Million) and a linked amount of 5. The party A quote is at the front of the queue.

At time T+1, the party A quote is distributed to trading floors with whom party A has bilateral credit and is displayed at the trader workstations of counterparty traders.

At time T+2, party B having seen the quote from party A submits a buy quote with a primary amount of 5 and a linked amount of 5 at the same price. The quote specifies that no more than 1 of the linked amount may be displayed as a visible order.

At time T+3, the system auto-matches the sell and buy offers at the same price, converting the party B buy order into the taker for the deal and a deal is pending for 10 between parties A and B.

At time T+4, the deal between parties A and B is confirmed for 10.

At time T+5, the system submits a new quote on behalf of party B at the same price as the original party B quote having a visible amount of 1 and a linked amount of 1. The quote has a lower time priority than any other quotes at the same price entered since time T.

Figure 6:
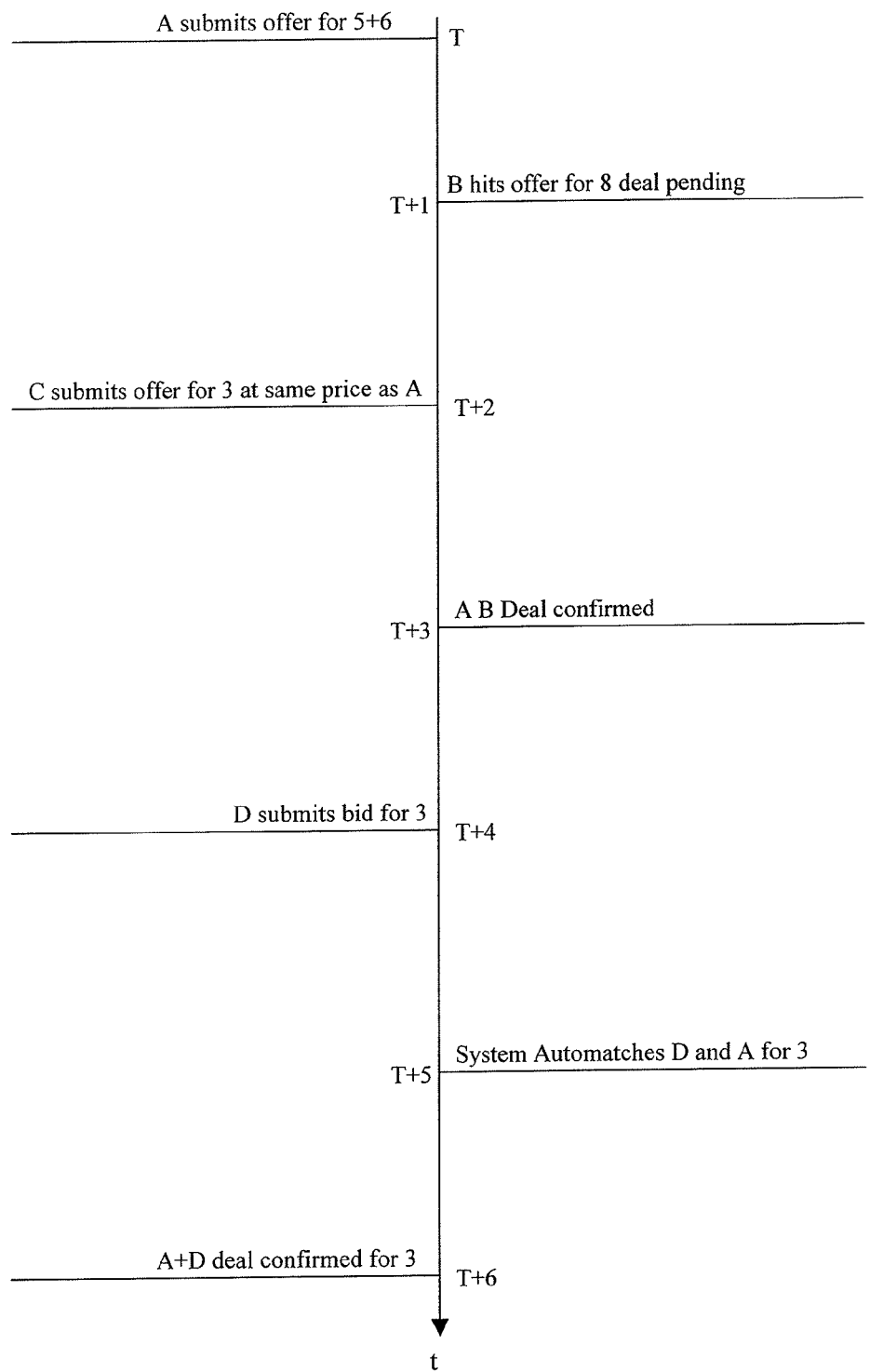
FIG. 6 is a time line diagram illustrating a fourth aspect of the invention.

Scenario 4—Reversal of matching order (FIG. 6).

At time T party A submits a quote with a primary offer amount of 5 and a linked amount of 6.

At time T+1 party B hits the offer for 8 and a deal between A and B is pending.

At time T+2 party C submits a quote with a primary offer amount of 3

At time T+3 the deal between party A and B completes.

At time T+4 party D submits a quote with a primary bid amount of 3

At time T+5 the system auto-matches the party D quote with the residual 3 of the party A primary amount. The party C quote, submitted before the party A and B deal is completed is not matched as the residual primary amount of the party A offer retains its price priority.

At time T+6 the deal between A and D is confirmed.

Thus, the embodiments described provide three modifications to linked amounts:

(i) reversal of the matching order to match linked amount before primary amount;

(ii) resubmission of unfilled maker linked amounts as new orders; and (iii) specification of maximum visible amount a linked amount may be converted into.

(ii) and (iii) may be combined together as in scenario 2. The auto-match scenario 3 enables taker linked amounts to be preserved and re-entered if the taker order is auto-matched.

Embodiments of the invention have the advantage that they make linked amounts more attractive to traders and provide them with a facility to enable large amounts to be dealt on an anonymous trading system without repeatedly having to re-submit orders into the system.

Many variations to the embodiments described are possible and will occur to those skilled in the art. In particular, embodiments of the invention may be implemented on any trading system regardless of its architecture and regardless of whether or not it is anonymous. Moreover, the invention is not limited to the trading of any particular product and is applicable to any product that may be traded. It is particularly suited to the trading of financial products such as financial instruments, especially foreign exchange products but is not limited thereto. The term financial instrument means any enforceable instrument having a monetary value. The invention is limited only by the scope of the following claims.

What is claimed is:

1. An automated trading system for trading products between traders, comprising:

a market distribution component configured to, in response to the trading system receiving from traders quotes to buy or sell products traded on the system, the quotes including a price, a visible amount and a linked hidden amount, distribute the quotes to traders so as to show the visible amounts, but not show the linked hidden amounts;

a matching engine configured to match the quotes to buy or sell products with orders received from traders in response to the distributed quotes, the matching engine being configured to match the visible amounts of quotes before the linked hidden amounts; and wherein the matching engine is configured to replenish a matched quote with any residual unmatched linked amount of the quote, the replenished quote being at the same price as the matched quote, wherein the matching engine further comprises an auto-matching component configured to match quotes received from two traders and convert one of the quotes into a taker order, wherein the quote to be converted into a taker order includes a price, a visible amount, a linked hidden amount, and an indication of a limit of the linked amount that can be shown as a visible amount; and wherein the matching engine is further configured to replenish the quote converted into the taker order following the auto-match with any residual unmatched linked amount, the replenished quote being at the same price as the matched quote the replenished quote having a visible amount up to the limit indicated with the remainder as a linked amount.

2. An automated trading system for trading products between traders, the system comprising:
one or more memories;
one or more severs being connected to one or more of the memories and configured to:
respond to the receipt of a quote associated with a first trader by storing the received quote, the received quote being a quote to buy or sell a product traded and including a price, a visible amount and a linked hidden amount, the received quote including an indication of a maximum amount of the linked amount that can be shown to traders as a visible amount in the submitted new quote and the one or more servers submit the new quote with a visible amount that does not exceed the maximum amount;
distribute the received quote to other traders using the system in a manner which causes the visible amount to be shown to the other traders, but the linked hidden amount not to be shown to the other traders;
respond to the receipt of an order associated with one of the other traders by storing the received order, the order being at the price of the quote and for an amount which is equal to or greater than the visible amount but less than the combination of the visible and linked hidden amounts,;
match the order with all of the visible amount and, if the order is for an amount which is greater than the visible amount, with a portion of the linked hidden amount so that there is a residual amount of the linked hidden amount which is unmatched; and
submit a new quote on behalf of the first trader into the system at the price of the received quote and with a visible amount.

3. The automated trading system of claim 2, wherein the new quote is submitted only after a deal for the matched amount of the quote has been confirmed.

4. The automated trading system of claim 2, wherein the visible amount of the new quote is equal to the residual amount.

5. The automated trading system of claim 2, wherein the visible amount of the new quote is less than the residual amount.

6. The automated trading system of claim 2, wherein the received order is for an amount which is greater than the visible amount.

7. The automated trading system of claim 2, wherein the new quote is for an amount equal to the residual amount.

8. An automated trading system for trading products between traders, comprising:
one or more memories;
one or more servers connected to one or more of the memories and configured to:
in response to the trading system receiving from traders quotes to buy or sell products traded on the system, the quotes including a price, a visible amount and a linked hidden amount, distribute the quotes to traders so as to show the visible amounts, but not show the linked hidden amounts;
match the quotes to buy or sell products with orders received from traders in response to the distributed quotes, the matching engine being configured to match the visible amounts of quotes before the linked hidden amounts;
replenish a matched quote with any residual unmatched linked amount of the quote, the replenished quote being at the same price as the matched quote,
match quotes received from two traders and convert one of the quotes into a taker order, wherein the quote to be converted into a taker order includes a price, a visible amount, a linked hidden amount, and an indication of a limit of the linked amount that can be shown as a visible amount; and
replenish the quote converted into the taker order following the auto-match with any residual unmatched linked amount, the replenished quote being at the same price as the matched quote a the replenished quote having a visible amount up to the limit indicated with the remainder as a linked amount.

* * * * *

UNITED STATES PATENT AND TRADEMARK OFFICE
CERTIFICATE OF CORRECTION

| | | |
|---|---|---|
| PATENT NO. | : 8,775,268 B2 | Page 1 of 1 |
| APPLICATION NO. | : 13/013952 | |
| DATED | : July 8, 2014 | |
| INVENTOR(S) | : Edward Howorka et al. | |

It is certified that error appears in the above-identified patent and that said Letters Patent is hereby corrected as shown below:

On the title page of the Letters Patent (75) Inventors, line 2 should read:

**\*\* Tracey Riordan, Parsippany, NJ (US) \*\***

Signed and Sealed this
Thirtieth Day of December, 2014

Michelle K. Lee
*Deputy Director of the United States Patent and Trademark Office*